(12) United States Patent
Lauyans

(10) Patent No.: US 7,380,649 B2
(45) Date of Patent: Jun. 3, 2008

(54) PALLET STOP FOR PALLET LOAD TRANSPORT SYSTEM

(75) Inventor: Frank M. Lauyans, Louisville, KY (US)

(73) Assignee: Lauyans & Company, Inc., Louisville, KY (US)

( * ) Notice: Subject to any disclaimer, the term of this patent is extended or adjusted under 35 U.S.C. 154(b) by 0 days.

(21) Appl. No.: 11/688,921

(22) Filed: Mar. 21, 2007

(65) Prior Publication Data

US 2007/0221476 A1   Sep. 27, 2007

Related U.S. Application Data

(60) Provisional application No. 60/743,747, filed on Mar. 24, 2006.

(51) Int. Cl.
*B65G 21/22* (2006.01)

(52) U.S. Cl. .................................. 198/345.3; 193/35 A

(58) Field of Classification Search ............. 198/345.3; 193/35 A

See application file for complete search history.

(56) References Cited

U.S. PATENT DOCUMENTS

| | | | | |
|---|---|---|---|---|
| 3,990,557 A | * | 11/1976 | Carder | ...................... 193/35 A |
| 4,597,707 A | | 7/1986 | Cornacchia | |
| 4,646,909 A | * | 3/1987 | vom Stein | ................ 193/35 A |
| 5,109,971 A | * | 5/1992 | Riner | ........................ 193/35 A |
| 5,213,189 A | * | 5/1993 | Agnoff | ..................... 193/35 A |
| 5,676,235 A | | 10/1997 | Sam et al. | |
| 6,234,292 B1 | * | 5/2001 | Schut | ....................... 193/35 A |

OTHER PUBLICATIONS

International Searching Authority/US, International Search Report and Written Opinion for PCT/US07/64621, Aug. 31, 2007.
Lauyans & Company, Inc., "Quick Custom—P&D Equipment Car Delivery" product literature and engineering drawings, Dec. 2002.

* cited by examiner

*Primary Examiner*—James R Bidwell
(74) *Attorney, Agent, or Firm*—Stites & Harbison, PLLC; David W. Nagle, Jr.; Robert C. Yang

(57) ABSTRACT

A pallet stop generally comprises a support frame, an internal enclosure, a rotating actuator, a pivoting stop, and a counterweight assembly. The rotating actuator has an upper arm portion that extends just above the surface of the enclosure. The enclosure is received in and supported by the support frame. As a pallet load moves across the enclosure, its leading edge will contact the upper arm portion of the rotating actuator, which causes it to rotate clockwise. A lower portion of the rotating actuator is positioned below the pivoting stop. As the rotating actuator rotates clockwise, the lower portion of the rotating actuator moves downwardly, thus allowing a counterclockwise rotation of the pivoting stop. Once the pallet load travels over the rotating actuator, the counterweight assembly causes the rotating actuator to return to the upright position to ensure a proper positioning of the pallet load.

17 Claims, 3 Drawing Sheets

PALLET STOP FOR PALLET LOAD TRANSPORT SYSTEM

CROSS-REFERENCE TO RELATED APPLICATIONS

This application claims priority to U.S. Provisional Patent Application No. 60/743,747, filed Mar. 24, 2006, the entire disclosure of which is incorporated herein by reference.

BACKGROUND OF THE INVENTION

The present invention relates to material handling systems and technology, and, more particularly, to a pallet stop for use in a pallet load transport system for moving pallet loads from a pick-up location to a deposit location.

In one common application of such a pallet load transport system, a pallet load is picked up from a mainline conveyor and deposited at an automatic storage and retrieval (ASRS) crane interface station. Alternatively, a pallet load may be picked up at the crane interface station and deposited onto the mainline conveyor. In any event, the pallet load system includes a shuttle car that moves between the mainline conveyor and the crane interface station to transport the pallet load.

In pallet load transport systems of the prior art, there is a pick-up and delivery (P&D) shuttle car that transports a pallet load between a mainline conveyor and a crane interface station. Specifically, the shuttle car is supported by and moves along a track between the mainline conveyor and the crane interface station. The shuttle car itself is generally comprised of a lower carriage and an upper carriage (or lift assembly), and the upper carriage can be raised or lowered relative to the lower carriage. Accordingly, as the shuttle car carries a pallet load between the mainline conveyor and the crane interface station, the upper carriage is commonly in a raised position relative to the lower carriage, but as the shuttle car approaches the mainline conveyor or the crane interface station, it is in a lowered position to pick-up or deposit a pallet load.

Furthermore, such prior art systems often include a spring-actuated pallet stop that is forced downward against the spring force as the pallet load moved over an upper surface of the stop. Once the pallet load clears the stop, the spring force causes the stop to raise and prevent the pallet load from moving back over the stop. However, because of the nature of the spring force, the upward force on the pallet load increases as it moved over the stop and the spring is further extended. Such increased upward force could actually cause the pallet load to be forced upward and off of the shuttle car, especially if the pallet load was unusually light. Additionally, because of the constant sliding motion of the pallet load over such a spring-loaded stop, wear can prove to be a problem, and the stop often gradually shifts position, making it less effective in ensuring proper positioning of a pallet load. Thus, there remains a need for an effective and reliable pallet stop for use with pallet load transport systems.

SUMMARY OF THE INVENTION

The present invention is a pallet stop for use in a pallet load transport system for moving pallet loads from a pick-up location to a deposit location.

An exemplary pallet stop in accordance with the present invention generally comprises a support frame, an internal (removable) enclosure secured to and housed within the support frame, a rotating actuator, a pivoting stop operably linked to the rotating actuator, and a counterweight assembly operably linked to the pivoting stop.

The rotating actuator has an upper arm portion that extends just above a surface of the enclosure and at an angle relative to the surface. As a pallet load moves over the surface of the enclosure, its leading edge will contact the upper arm portion of the rotating actuator, which causes it to rotate clockwise about a pivot axis. A lower portion of the rotating actuator is positioned below the pivoting stop. Accordingly, as the rotating actuator rotates clockwise about the pivot axis, the lower portion of the rotating actuator moves downwardly, thus allowing a counterclockwise rotation of the pivoting stop about a pivot axis. In other words, in an upright position, the lower portion of the rotating actuator supports and prevents movement of the pivoting stop, but once the rotating actuator is rotated out of the way, the weight of the pivoting stop causes it to drop into the enclosure and out of the path of travel of the pallet load.

Once the pallet load travels completely over the rotating actuator, the counterweight assembly causes the rotating actuator to return to the upright position. In this regard, the force of the counterweight acts around the circumference of a sprocket operably connected to and rotating with the rotating actuator. Specifically, a chain is operably connected to and engages the sprocket, and a weight is operably connected to a distal end of this chain. This counterweight assembly thus causes the counterclockwise rotation of the rotating actuator back to the upright position as soon as there is no more force applied to the upper arm portion of the rotating actuator. As the rotating actuator returns to the upright position, the pivoting stop also returns to its upright position, engaging and preventing any further movement of the pallet load. Accordingly, proper positioning of a pallet load is ensured.

DETAILED DESCRIPTION OF THE INVENTION

The present invention is a pallet stop for use in a pallet load transport system for moving pallet loads from a pick-up location to a deposit location.

Figure 1:
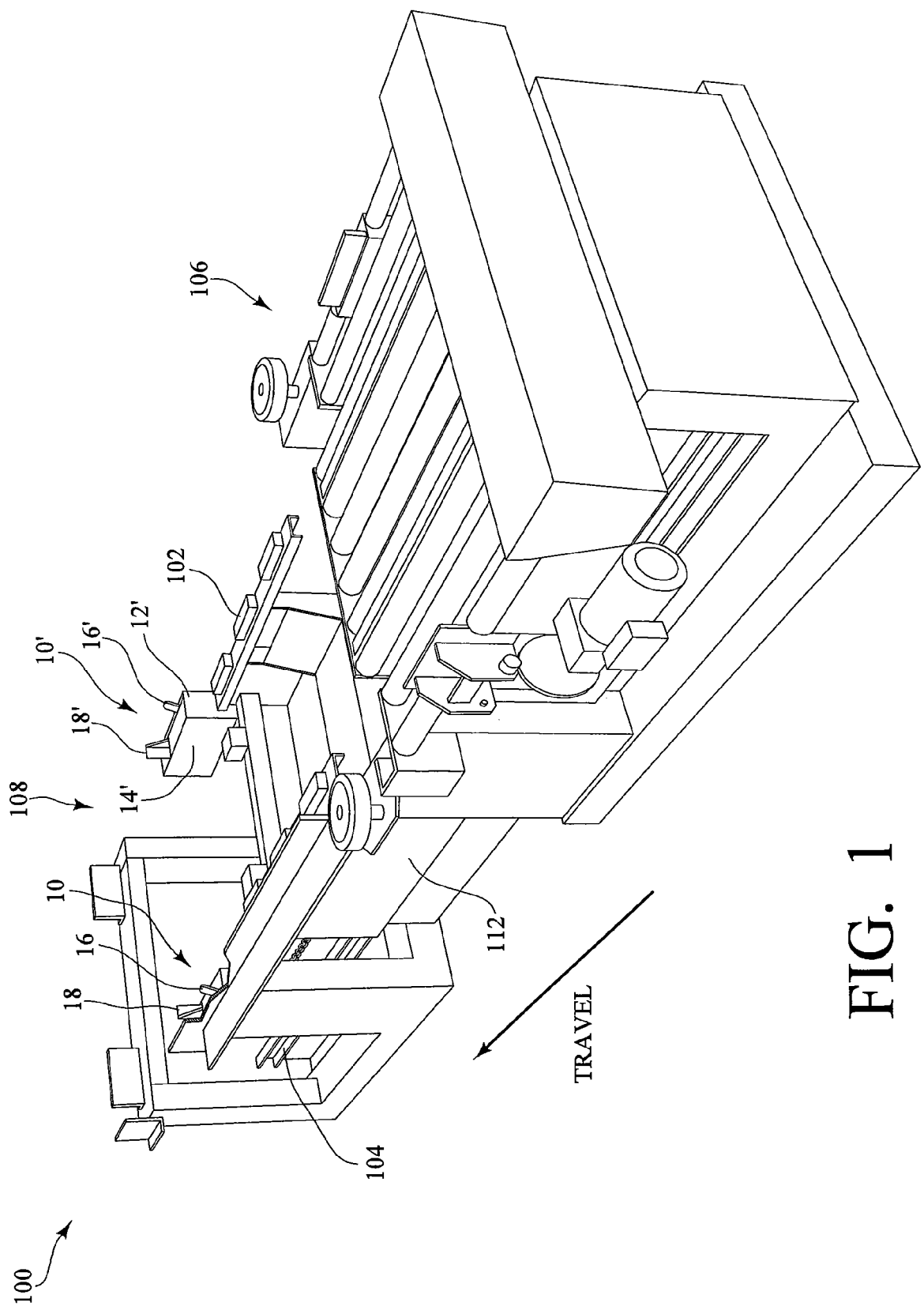
FIG. 1 is a perspective view of a pallet load transport system including pallet stops made in accordance with the present invention.

At the outset, it should be recognized that a pallet load transport system 100 utilized with the present invention operates in the same general manner as prior art constructions as discussed above. Specifically, and as illustrated in FIG. 1, the pallet load transport system 100 includes a shuttle car 102 that is supported by and moves along a track 104 between the mainline conveyor 106 and the crane interface station 108. The shuttle car 102 generally comprises a lower carriage (not shown) and an upper carriage 112, with the upper carriage 112 able to be raised or lowered relative to the lower carriage. Accordingly, as the shuttle car 102 carries a pallet load (not shown) between the mainline conveyor 106 and the crane interface station 108, the upper carriage 112 is commonly in a raised position relative to the lower carriage. As the shuttle car 102 approaches the mainline conveyor 106 or the crane interface station 108, it is in a lowered position to pick-up or deposit a pallet load.

Figure 2:
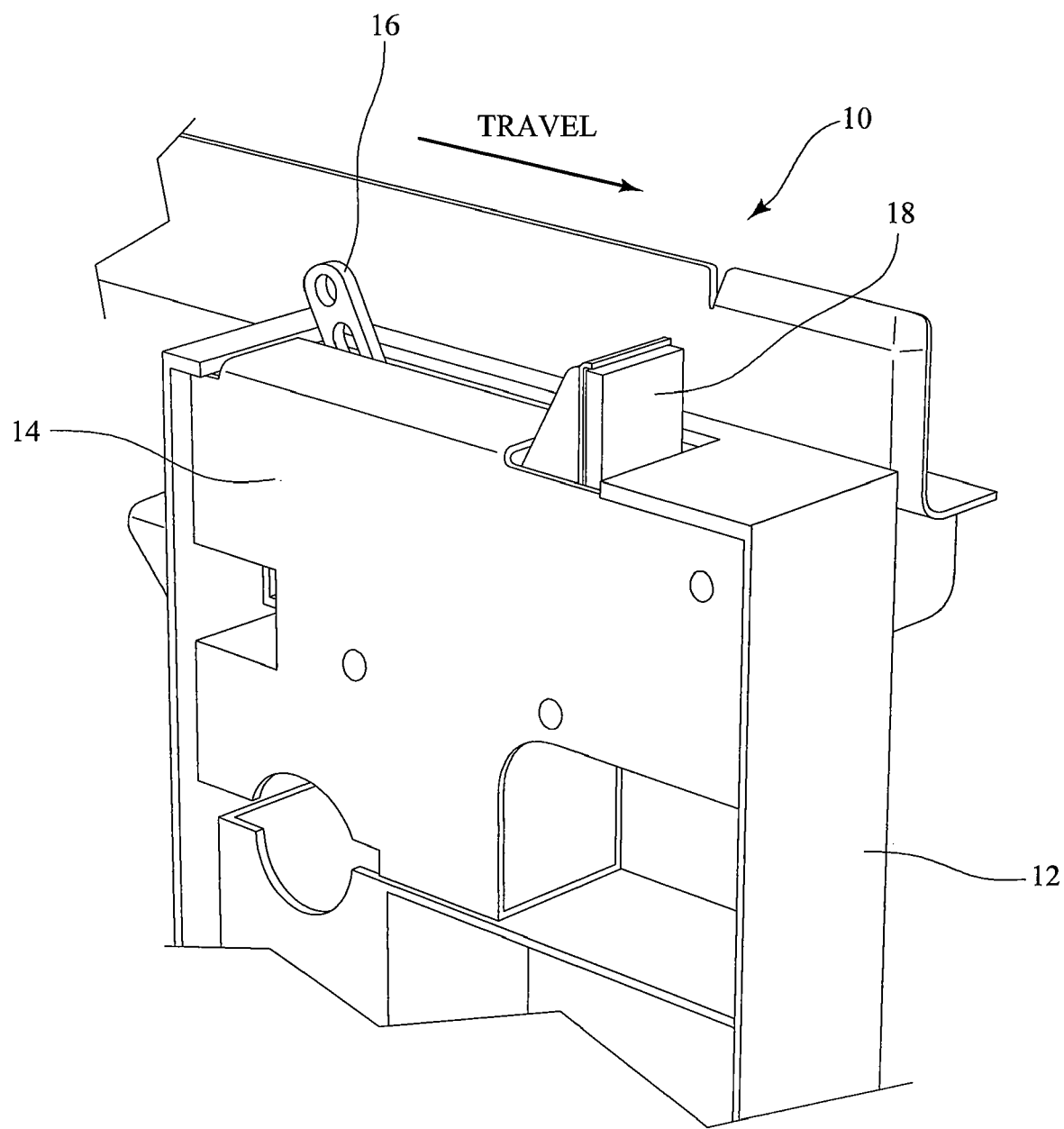
FIG. 2 is a perspective view of a pallet stop of the pallet load transport system of FIG. 1.
Figure 3A:
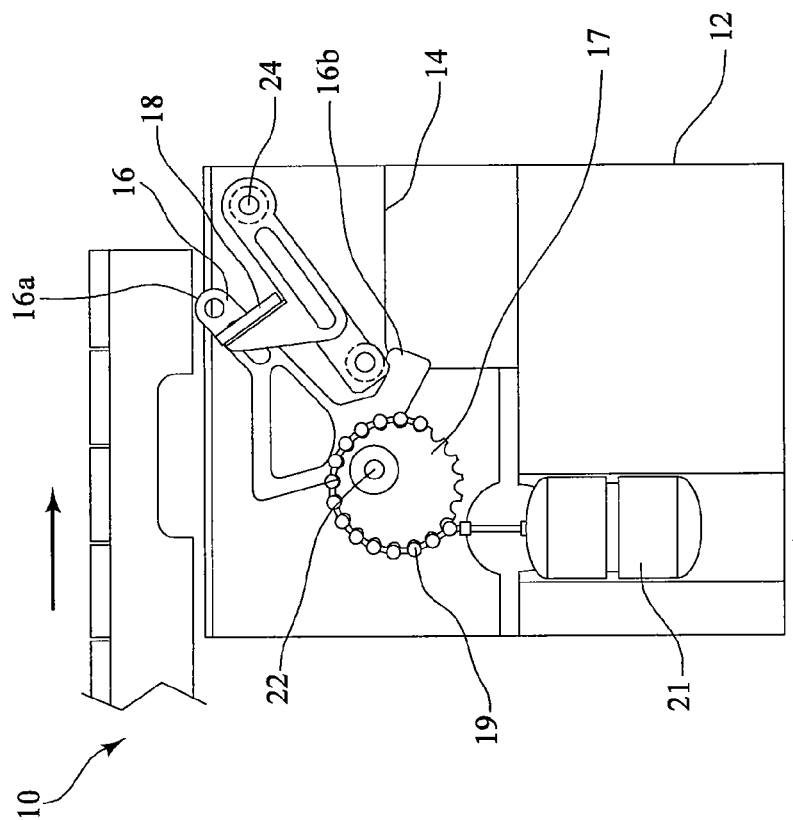
FIG. 3A is a side view of the pallet stop of FIG. 2 with its exterior wall removed to show internal components and illustrating the pallet stop in an upright position.
Figure 3B:
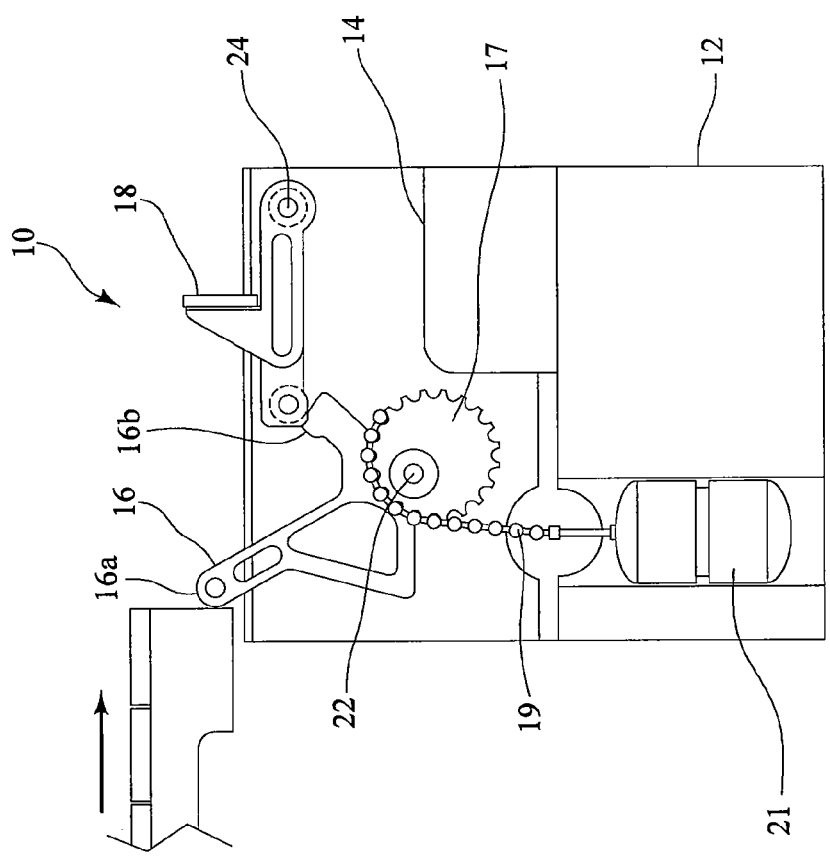
FIG. 3B is a side view of the pallet stop of FIG. 2 with its exterior wall removed to show internal components and illustrating the pallet stop in a retracted position.

In order to ensure the proper positioning of a pallet load at the crane interface station 108 or at the mainline conveyor 106, the pallet load transport system 100 includes one or more pallet stops 10, 10'. Referring now to FIGS. 2, 3A, and 3B, an exemplary pallet stop 10 made in accordance with the present invention generally comprises a support frame 12, an internal (removable) enclosure 14 secured to and housed within the support frame 12, a rotating actuator 16, a pivoting stop 18 operably linked to the rotating actuator 16, and a counterweight assembly 20 operably linked to the rotating actuator 16. Of course, and as illustrated in FIG. 1, such a pallet stop 10, 10' is preferably positioned on either side of the track 104 near the crane interface station 108 or the mainline conveyor 106. This can be accomplished by securing the support frame 12 to the outer rails of the track 104 for the shuttle car 102, similar to the positioning of prior art pallet stops, as illustrated in FIG. 1. In this particular example, the pallet stops 10, 10' are arranged to ensure the proper positioning of a pallet load at the crane interface station 108, with pallet loads traveling from the mainline conveyor 106 to the crane interface station 108.

Referring again to FIGS. 3A and 3B, the rotating actuator 16 has an upper arm portion 16a that extends just above a surface of the enclosure 14, and in this example, at a 60° angle relative to the surface. In this regard, it should be noted that the enclosure 14 houses the rotating actuator 16 and pivoting stop 18. The enclosure 14 is received in and supported by the support frame 12 and may be characterized as "modular" in that it is designed for ready removal for maintenance or replacement.

Referring still to FIGS. 3A and 3B, as a pallet load 200 moves over the surface of the enclosure 14 (from left to right in FIGS. 3A and 3B), its leading edge will contact the upper arm portion 16a of the rotating actuator 16, which causes it to rotate clockwise about a pivot axis 22. A lower portion 16b of the rotating actuator 16 is positioned below the pivoting stop 18. Accordingly, as the rotating actuator 16 rotates clockwise about the pivot axis 22, the lower portion 16b of the rotating actuator 16 moves downwardly, thus allowing a counterclockwise rotation of the pivoting stop 18 about a pivot axis 24. In other words, in an upright position, the lower portion 16b of the rotating actuator 16 supports and prevents movement of the pivoting stop 18 (i.e., a locked position), but once the rotating actuator 16 is rotated out of the way, the weight of the pivoting stop 18 causes it to drop substantially into the enclosure 14 and out of the path of travel of the pallet load 200, as illustrated in FIG. 3B.

Once the pallet load 200 travels completely over the rotating actuator 16, the counterweight assembly 20 causes the rotating actuator 16 to return to the upright position, as illustrated in FIG. 3A. In this regard, the force of the counterweight assembly 20 acts around the circumference of a sprocket 17 operably connected to and rotating with the rotating actuator 16. Specifically, a chain 19 is operably connected to and engages the sprocket 17, and a weight 21 is operably connected to a distal end of this chain 19. This counterweight assembly 20 thus causes the counterclockwise rotation of the rotating actuator 16 back to the upright position as soon as there is no more force applied to the upper arm portion 16a of the rotating actuator 16. Of course, as the rotating actuator 16 returns to the upright position, the pivoting stop 18 also returns to its upright position, engaging and preventing any further movement of the pallet load 200. Accordingly, proper positioning of the pallet load 200 is ensured.

As a further refinement, and as illustrated in FIGS. 3A and 3B, the center of rotation of the sprocket 17 may be offset from the pivot axis 22 of the rotating actuator 16. As such, the force required to initially "push" and start the clockwise rotation of the rotating actuator 16 is minimal, but the force increases as the clockwise rotation continues. Accordingly, once the pallet load 200 travels completely over the rotating actuator 16, the counterweight assembly 20 will cause a rapid return of the rotating actuator 16 to the upright position.

Alternatively, and as mentioned above, it is contemplated that such a pallet stop could be used not only at the crane interface station, but also at the mainline conveyor. In this regard, each pallet stop would be positioned with the face of the pivoting stop along the edge of the effective width of the mainline conveyor.

One of ordinary skill in the art will recognize that additional embodiments are also possible without departing from the teachings of the present invention. This detailed description, and particularly the specific details of the exemplary embodiment disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A pallet stop for use in a pallet load transport system for moving pallet loads from a pick-up location to a deposit location, comprising:
   a support frame;
   a rotating actuator secured to and housed within said support frame;
   a pivoting stop operably linked to said rotating actuator; and
   a counterweight assembly operably linked to said rotating actuator;
   wherein, as a particular pallet load travels along a path over a surface of said support frame, its leading edge will contact an upper arm portion of said rotating actuator, causing said upper arm portion to rotate about a first pivot axis out of the path of travel of the particular pallet load, which, in turn, causes a corresponding rotation of said pivoting stop about a second pivot axis such that the pivoting stop is also drawn out of the path of travel of the particular pallet load; and
   wherein once the particular pallet load travels completely over said rotating actuator, said counterweight assembly causes said rotating actuator and said pallet stop to return to an upright position, engaging and preventing any further movement of the particular pallet load.

2. The pallet stop of claim 1, and further comprising an enclosure secured to and housed within said support frame for housing said rotating actuator, said pivoting stop, and said counterweight assembly.

3. The pallet stop of claim 2, wherein said rotating actuator extends above the surface of said enclosure at an approximately 60° angle relative to the surface of said enclosure.

4. The pallet stop of claim 1, wherein said counterweight assembly comprises a sprocket operably connected to and rotating with said rotating actuator, a chain operably connected to and engaging said sprocket, and a weight operably connected to a distal end of said chain.

5. The pallet stop of claim 4, wherein said sprocket has a center of rotation offset from said first pivot axis.

6. The pallet stop of claim 1, wherein the pallet stop is arranged near the pick-up location.

7. The pallet stop of claim 1, wherein the pallet stop is arranged near the deposit location.

8. A pallet load transport system for moving pallet loads from a pick-up location to a deposit location, comprising:
   a track extending between said pick-up location and said deposit location;
   a shuffle car adapted for movement along said track, including a lower carriage and an upper carriage, the upper carriage being adapted for movement between a raised position and a lowered position relative to the lower carriage; and
   a plurality of pallet stops, each said pallet stop including
      a support frame,
      a rotating actuator secured to and housed within said support frame,
      a pivoting stop operably linked to said rotating actuator, and
      a counterweight assembly operably linked to said rotating actuator,
      wherein, as a particular pallet load travels along a path over a surface of said support frame, its leading edge will contact an upper arm portion of said rotating actuator, causing said upper arm portion to rotate about a first pivot axis, which, in turn, causes a corresponding rotation of said pivoting stop about a second pivot axis such that the pivoting stop is drawn out of the path of travel of the particular pallet load; and
      wherein once the particular pallet load travels completely over said rotating actuator, said counterweight assembly causes said rotating actuator to return to an upright position, engaging and preventing any further movement of the particular pallet load.

9. The pallet load transport system of claim 8, in which each said pallet stop further includes an enclosure secured to and housed within said support frame for housing said rotating actuator, said pivoting stop, and said counterweight assembly.

10. The pallet load transport system of claim 9, wherein said rotating actuator extends above the surface of said enclosure at an approximately 60° angle relative to the surface of said enclosure.

11. The pallet load transport system of claim 8, wherein the counterweight assembly of each said pallet stop comprises a sprocket operably connected to and rotating with said rotating actuator, a chain operably connected to and engaging said sprocket, and a weight operably connected to a distal end of said chain.

12. The pallet load transport system of claim 11, wherein said sprocket has a center of rotation offset from said first pivot axis.

13. The pallet load transport system of claim 8, wherein one of said pallet stops is positioned on either side of the particular pallet load near the pick-up location.

14. The pallet load transport system of claim 8, wherein one of said pallet stops is positioned on either side of the particular pallet load near the deposit location.

15. The pallet load transport system of claim 8, wherein the support frame of said pallet stop is secured to an outer rail of the track.

16. A pallet stop for use in a pallet load transport system for moving pallet loads from a pick-up location to a deposit location, comprising:
   a support frame;
   a rotating actuator secured to and housed within said support frame;
   a pivoting stop operably linked to said rotating actuator; and
   a counterweight assembly operably linked to said rotating actuator, said counterweight assembly including a sprocket operably connected to and rotating with said rotating actuator, a chain operably connected to and engaging said sprocket, and a weight operably connected to a distal end of said chain;
   wherein, as a particular pallet load travels along a path over a surface of said support frame, its leading edge will contact an upper arm portion of said rotating actuator, causing said upper arm portion to rotate about a first pivot axis, which, in turn, causes a corresponding rotation of said pivoting stop about a second pivot axis such that the pivoting stop is drawn out of the path of travel of the particular pallet load; and
   wherein once the particular pallet load travels completely over said rotating actuator, said counterweight assembly causes said rotating actuator and said pivoting stop to return to an upright position, engaging and preventing any further movement of the particular pallet load.

17. The pallet stop of claim 16, wherein said sprocket has a center of rotation offset from said first pivot axis.

* * * * *

UNITED STATES PATENT AND TRADEMARK OFFICE
CERTIFICATE OF CORRECTION

PATENT NO. : 7,380,649 B2  Page 1 of 1
APPLICATION NO. : 11/688921
DATED : June 3, 2008
INVENTOR(S) : Lauyans It is certified that error appears in the above-identified patent and that said Letters Patent is hereby corrected as shown below:

IN THE CLAIMS:

In claim 8, col. 5, line 11: change "shuffle" to --shuttle--

Signed and Sealed this

Fifth Day of August, 2008

JON W. DUDAS
*Director of the United States Patent and Trademark Office*